United States Patent
Ito et al.

(10) Patent No.: US 8,264,456 B2
(45) Date of Patent: Sep. 11, 2012

(54) PORTABLE ELECTRONIC APPARATUS, USER INTERFACE CONTROLLING METHOD, AND PROGRAM

(75) Inventors: Hiroshi Ito, Kanagawa (JP); Akane Sano, Tokyo (JP); Makoto Inoue, Tokyo (JP); Katsuya Shirai, Kanagawa (JP); Motoyuki Takai, Tokyo (JP); Hirofumi Tamori, Tokyo (JP); Kenichi Makino, Kanagawa (JP)

(73) Assignee: Sony Corporation, Tokyo (JP)

( * ) Notice: Subject to any disclaimer, the term of this patent is extended or adjusted under 35 U.S.C. 154(b) by 1140 days.

(21) Appl. No.: 11/697,825

(22) Filed: Apr. 9, 2007

(65) Prior Publication Data

US 2008/0001770 A1 Jan. 3, 2008

(30) Foreign Application Priority Data

Apr. 14, 2006 (JP) ................... 2006-112071

(51) Int. Cl.
*G09G 5/08* (2006.01)
(52) U.S. Cl. ........................................ 345/158
(58) Field of Classification Search ........... 345/156–184
See application file for complete search history.

(56) References Cited

U.S. PATENT DOCUMENTS

| 7,173,604 B2 * | 2/2007 | Marvit et al. ................. 345/156 |
| 7,184,020 B2 * | 2/2007 | Matsui ........................... 345/156 |
| 2004/0130524 A1 | 7/2004 | Matsui |
| 2005/0212911 A1 | 9/2005 | Marvit et al. |
| 2006/0052109 A1 | 3/2006 | Ashman, Jr. et al. |
| 2007/0156679 A1* | 7/2007 | Kretz et al. .......................... 707/6 |

FOREIGN PATENT DOCUMENTS

| JP | 2000-148351 | 5/2000 |
| JP | 2001-215998 | 8/2001 |
| JP | 2002-330210 | 11/2002 |
| JP | 2004-53930 | 2/2004 |
| JP | 2004-219947 | 8/2004 |
| JP | 2005-156641 | 6/2005 |
| JP | 2005-221816 | 8/2005 |
| JP | 2007-66452 | 3/2007 |
| JP | 2007-258885 | 10/2007 |

OTHER PUBLICATIONS

U.S. Appl. No. 11/768,541, filed Jun. 26, 2007, Sano, et al.
Extended Search Report issued Jan. 26, 2012 in Europe Application No. 07106134.5.
Miguel Bruns Alonso, et al., "MusicCube: Making Digital Music Tangible", CHI 2005, Apr. 7, 2005, XP040017377, pp. 1176-1179.

* cited by examiner

*Primary Examiner* — Jimmy H Nguyen
(74) *Attorney, Agent, or Firm* — Oblon, Spivak, McClelland, Maier & Neustadt, L.L.P.

(57) ABSTRACT

An electronic apparatus is disclosed which includes: a main body motion determination device configured to determine whether a predetermined accelerated motion is exerted on a main body of the electronic apparatus in a predetermined axial direction; and a control device configured to control the electronic apparatus to perform a predetermined action based on a pattern of the predetermined accelerated motion determined to occur by the main body motion determination device.

18 Claims, 12 Drawing Sheets

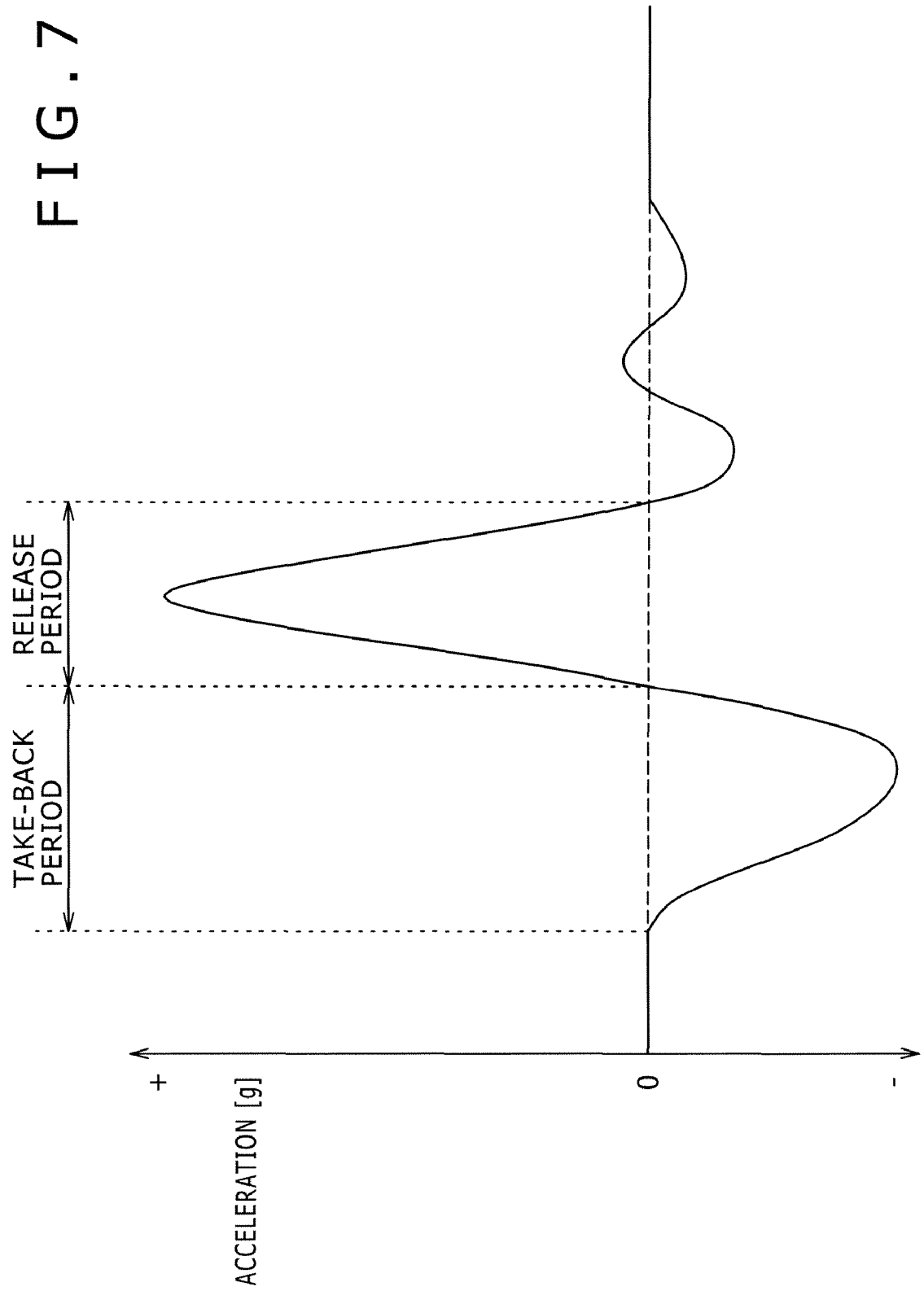

PORTABLE ELECTRONIC APPARATUS, USER INTERFACE CONTROLLING METHOD, AND PROGRAM

CROSS REFERENCES TO RELATED APPLICATIONS

The present invention contains subject matter related to Japanese Patent Application JP 2006-112071 filed with the Japan Patent Office on Apr. 14, 2006, the entire contents of which being incorporated herein by reference.

BACKGROUND OF THE INVENTION

1. Field of the Invention

The present invention relates to a portable electronic apparatus, a user interface controlling method for use with the portable electronic apparatus, and a program for implementing the user interface controlling method using the portable electronic apparatus.

2. Description of the Related Art

Various operation input devices have been proposed and are coming into use. In operation, they generally utilize information such as inclination angle and rotation angle sensed by acceleration sensors and other sensing elements. Illustratively, Japanese Patent Laid-open No. Hei 5-257595 discloses a setup furnished with a biaxial (X and Y axes) angular velocity sensor as a coordinate input device (pointing device) replacing the traditionally employed operation input device such as a mouse. This device is designed to convert the rotated state of the main body into coordinate information. For example, a user holds this coordinate input device by hand and moves it in the air to carry out certain operations.

SUMMARY OF THE INVENTION

An embodiment of the present invention proposes technical arrangements for causing an operation input device, as its main body is moved, to operate an electronic apparatus through the use of sensing signals obtained illustratively from an acceleration sensor. These arrangements are particularly useful when applied to portable electronic apparatuses including portable content players used extensively today.

In carrying out the present invention and according to one embodiment thereof, there is provided an electronic apparatus including: a main body motion determination device 30 configured to determine whether a predetermined accelerated motion is exerted on a main body of the electronic apparatus in a predetermined axial direction; and a control device configured to control the electronic apparatus to perform a predetermined action based on a pattern of the predetermined accelerated motion determined to occur by the main body motion determination device 30.

Preferably, the main body motion determination device 30 may determine whether the predetermined accelerated motion is exerted on the main body based on whether a rate of change in acceleration per unit time in the predetermined axial direction is determined to exceed a predetermined value.

Preferably, the main body motion determination device 30 may determine whether the predetermined accelerated motion is exerted on the main body based on whether a reciprocal motion is sensed within a predetermined time period in the predetermined axial direction.

Preferably, the main body motion determination device 30 may include an acceleration sensing device configured to sense acceleration in the axial direction; and the main body motion determination device 30 may determine whether the predetermined accelerated motion is exerted on the main body based on a sensing output coming from the acceleration sensing device.

Preferably, the control device may control the electronic apparatus to perform the predetermined action if the predetermined accelerated motion is determined to have occurred a predetermined number of times within a predetermined time period by the main body motion determination device 30.

Preferably, the main body motion determination device 30 may determine whether the predetermined accelerated motion is exerted in each of at least two predetermined axial directions; and the control device may control the electronic apparatus to perform a different predetermined action based on a pattern of the predetermined accelerated motion determined to occur by the main body motion determination device 30 in each of those at least two axial directions.

Preferably, the electronic apparatus may further include an inclination angle sensing device configured to sense an inclination angle in the predetermined axial direction; wherein the control device may control the electronic apparatus to perform the predetermined action based on whether the predetermined accelerated motion is determined to be exerted on the main body of the electronic apparatus in the predetermined axial direction by the main body motion determination device 30 and in accordance with the inclination angle sensed by the inclination angle sensing device when the predetermined accelerated motion is determined to be exerted on the main body of the electronic apparatus in the predetermined axial direction.

Preferably, the electronic apparatus may further include an operation device, and an operation determination device configured to determine whether an operation is performed on the operation device; wherein the control device may control the electronic apparatus to perform the predetermined action based on whether the operation is determined to be performed on the operation device by the operation determination device.

Preferably, the electronic apparatus may further include a reproduction device configured to reproduce content data; wherein the predetermined action may be an action for changing a reproduction mode in which to reproduce the content data.

Preferably, the action for changing the reproduction mode may involve changing a shuffle reproduction mode in which the content data is reproduced in a random sequence.

According to another embodiment of the present invention, there is provided a controlling method including the steps of: determining whether a predetermined accelerated motion is exerted on a main body of an apparatus in a predetermined axial direction; and controlling the apparatus to perform a predetermined action based on a pattern of the predetermined accelerated motion determined to occur in the main body motion determining step.

According to a further embodiment of the present invention, there is provided a recording medium which records a program in a manner readable by a computer, the program causing the computer to execute a procedure including the steps of: determining whether a predetermined accelerated motion is exerted on a main body of an apparatus in a predetermined axial direction; and controlling the apparatus to perform a predetermined action based on a pattern of the predetermined accelerated motion determined to occur in the main body motion determining step.

Where the electronic apparatus above according to the invention is in use typically in portable fashion or where the above-outlined inventive controlling method or program is employed in conjunction with such an apparatus, it is possible to control the action of the apparatus by having its main body shaken vigorously in a previously timed manner for a predetermined number of times. The inventive arrangements provide a new way of allowing the user to perform input operations, so that the apparatus embodying the invention is operated more easily in a more entertaining manner than before.

BRIEF DESCRIPTION OF THE DRAWINGS

FIG. 7 is a graphic representation showing a waveform indicative of acceleration values detected from a shaking operation;

DETAILED DESCRIPTION OF THE PREFERRED EMBODIMENTS

Figure 1:
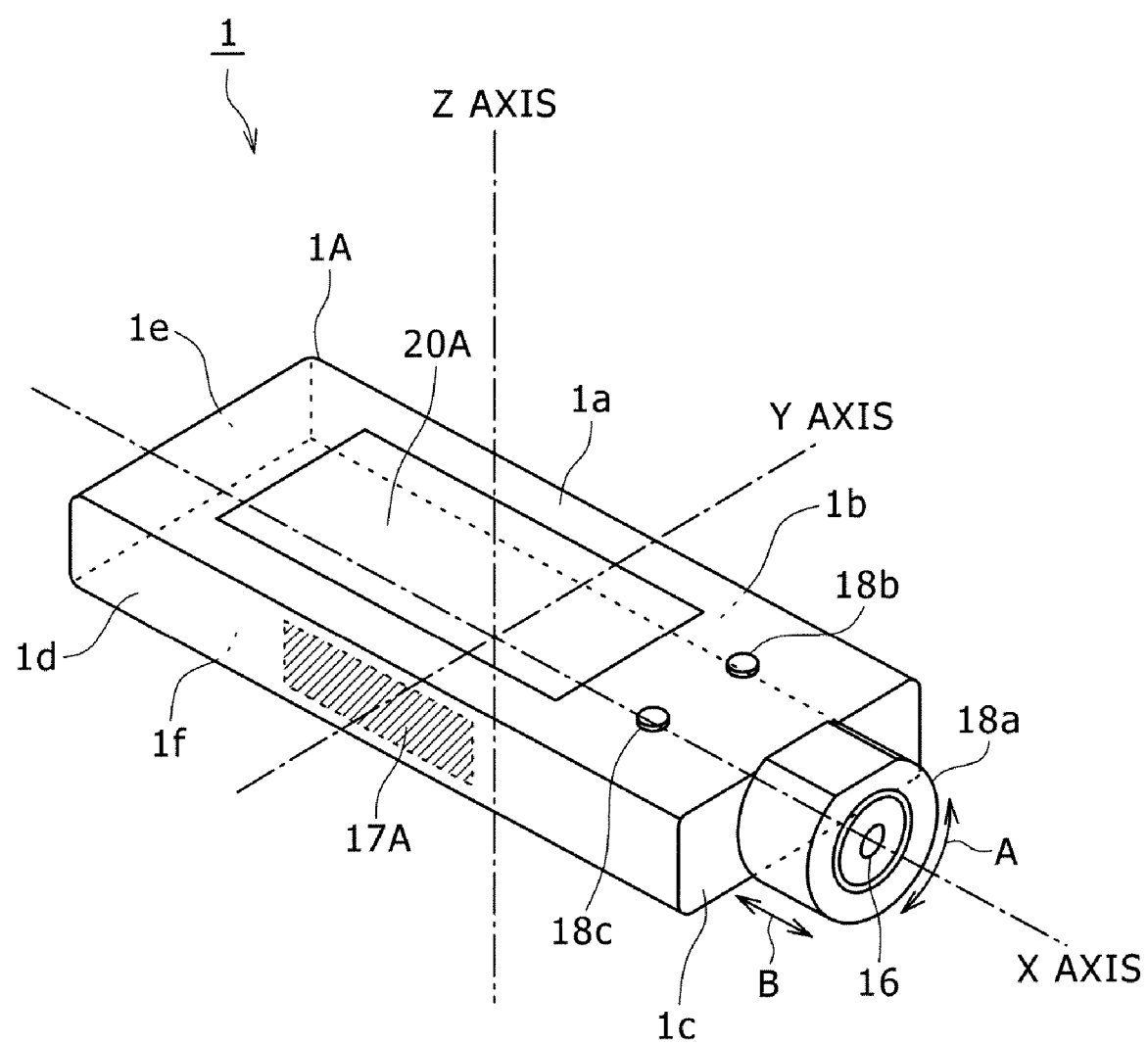
FIG. 1 is an external view of a portable content player practiced as an embodiment of the present invention.

FIG. 1 is an external view of a portable content player 1 practiced as one preferred embodiment of the present invention (called the embodiment hereunder). A main body 1A of the portable content player 1 shown here is illustratively small enough to be carried by a user in one hand and has the shape of a rectangular solid. As illustrated, the main body 1A has six sides: a top side 1a, a front side 1b, a left-hand side 1c, a back side 1d, a right-hand side 1e, and an underside 1f. The shape of the main body 1A and the appearance of the portable content player 1 shown in FIG. 1 are only examples.

A display screen part 20A is located on the top side 1a of the main body 1A. The display screen part 20A displays indications reflecting the current operation state of the portable content player 1. Illustratively, when the portable content player 1 is reproducing a content, the display screen part 20A displays the title of the currently reproduced content, the ongoing playing time, and other relevant information in text and in graphics. With this embodiment, the top of the display screen part 20A is oriented to the front side 1b and the bottom to the back side 1b. That is, the user can view an unreversed image on the display screen part 20A when orienting the front side 1b of the main body 1A upward.

The portable content player 1 has a jog dial 18a mounted on the left-hand side 1c and has key buttons 18b and 18c on the top side 1a. These are operating elements that are pushed or rotated physically by the user for executing operations. As indicated by an arrow A, the jog dial 18a may be rotated clockwise or counterclockwise within a predetermined range of angles. The jog dial 18a may also be pushed into the main body 1A or pulled away from it as indicated by an arrow B. The key buttons 18a and 18c can be depressed and released as is generally the case with this type of controls. Most of the operations of the portable content player 1 embodying this invention can be effected using these operating elements. As will be discussed later, some of the operations may be carried out not by operating these elements but by shaking the manually held player 1 vigorously.

The portable content player 1 is furnished with a touch-sensitive part 17A. Illustratively, the touch-sensitive part 17A is located on the back side 1d of the main body 1A shown hatched. Fingertips (or any other part of the human body) touching this part cause an internal touch sensor to sense the touching operation. As will be discussed later, a touch on the touch-sensitive part 17A is performed concurrently with an operation to change the attitude of the main body 1A. Depending on the touch sensing method in use (e.g., that of the capacitance type pressure sensor), there is no need to expose the sensor unit in the touch-sensitive part 17A. In such a case, that housing portion of the main body 1A which corresponds to the touch-sensitive part 17A should preferably be embossed to let the user know where the sensor is located. The location of the touch-sensitive part 17A and the area occupied thereby in the main body 1A may be suitably varied depending on the actual shape and size of the main body 1A as well as on how the body is likely to be shaken in practice.

With this embodiment, a headphone terminal 16 is positioned inside the perimeter of the jog dial 18a. The audio of the content data reproduced by the portable content player 1 is output through the headphone terminal 16.

Figure 2:
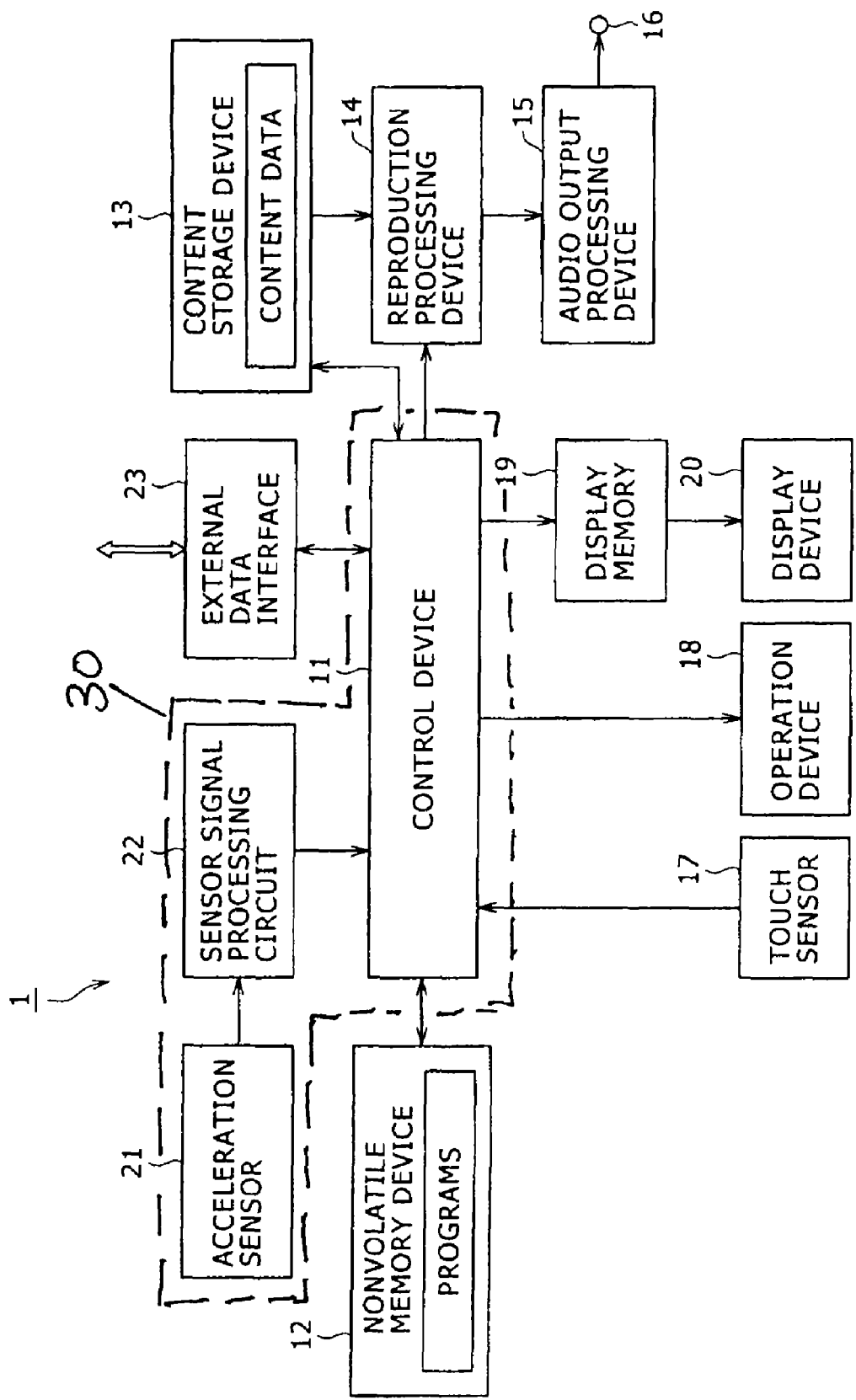
FIG. 2 is a block diagram showing a typical structure of the portable content player embodying the present invention.

FIG. 2 is a block diagram showing a typical structure of the portable content player 1 embodying the present invention. In FIG. 2, a control device 11 is illustratively composed of a microcomputer containing a CPU (central processing unit), a ROM and a RAM. As such, the control device 11 carries out diverse control operations in the portable content player 1.

A nonvolatile memory device 12 is illustratively constituted by a semiconductor memory device such as a flash memory that retains stored data when the main power supply is removed. In FIG. 2, the nonvolatile memory device 12 is shown to hold the programs to be carried out by the CPU of the control device 11. Other types of data may be retained in the memory device 12. Conceivably, the memory device 12 may accommodate setting data and management information for use by the control device 11 in effecting various control operations.

A content storage device 13 stores illustratively in files the content data to be reproduced and output by the portable content player 1. The present invention poses no restrictions on the types and file formats of the content data that may be stored in the content storage device 13. For purpose of simplification and illustration, this embodiment assumes that the content data to be held in the content storage device 13 is audio data compression-encoded by a specific encoding method in a particular format for reproduction.

With the current state of the art, the storage medium to be actually adopted by the content storage device 13 may be typically a hard disk drive (HDD), a flash memory, or some other suitable nonvolatile semiconductor memory device. However, these media are not limitative of the present invention and may be replaced by any suitable storage medium that may be developed and marketed in the future. The storage medium may be either built in the portable content player 1 or loaded removably into a suitable drive housed in the player 1. In FIG. 2, the content storage device 13 and nonvolatile memory device 12 are each shown located in a different function block. Alternatively, the content storage device 13 and nonvolatile memory device 12 may physically share a common storage medium.

The portable content player 1 of this embodiment uses an external data interface 23 in order to acquire content data to be placed into the content storage device 13. More specifically, the portable content player 1 is connected to a personal computer or like equipment acting as a host through the external data interface 23. In this setup, content data is transferred from the host to the portable content player 1. The portable content player 1 receives and acquires the transferred content data illustratively under control of the control device 11, and writes the obtained content data to the storage medium in the content storage device 13.

The external data interface 23 is constituted by suitable hardware and software elements which comply with predetermined data communication standards and which communicate with an external device either by cable or in wireless fashion. With the current state of the art, the communication standards supported by the external data interface 23 may be any of IEEE1394, USB, Ethernet, Bluetooth, and IEEE802.11a/b/g, which are only examples and are not limitative of the invention.

A reproduction processing device 14 under control of the control device 11 inputs content data upon retrieval from the content storage device 13 and performs suitable reproduction signal processes on the input data. Since the content data is assumed to be audio data compression-encoded by a predetermined method and offered in files, the reproduction processing device 14 performs demodulation and other processes on the compression-encoded data and outputs the processed data to an audio output processing device 15. The audio output processing device 15 carries out post-demodulation audio signal processes such as tone control, volume control and amplification on the input audio signal to obtain a headphone-driving audio signal that is output to the headphone terminal 16.

A display device 20 is a device furnished with the display screen part 20A shown in FIG. 1. Diverse displays are given on the display screen part 20A. When an image is to be displayed on the display device 20, the control device 11 causes a display memory 19 to retain display data and controls the display device 20 to perform display drive operations using the display data from the display memory 19.

An operation device 18 generically refers to the operating elements including the jog dial 18a and key buttons 18b and 18c on the main body 1A as well as to related components that generate an operation designation signal reflecting each operation performed on these operating elements, before outputting the generated signal to the control device 11. Given the operation designation signal from the operation device 18, the control device 11 carries out relevant processes.

A touch sensor 17 is furnished in such a manner that its sensor unit is located corresponding to the touch-sensitive part 17A explained in reference to FIG. 1. As discussed above, the contact or noncontact of fingertips or any other body part with the touch-sensitive part 17A is sensed by the touch sensor 17. An actual hardware device constituting the touch sensor may be a known sensor device adopting a known sensing method (e.g., that of the resistive touch display or capacitance type pressure sensor) or a sensor device operating on a suitable principle to be developed in the future.

The portable content player 1 of this embodiment also has an acceleration sensor 21. The acceleration sensor 21 is designed to sense acceleration on three axes: an X axis, a Y axis perpendicular to the X axis, and a Z axis perpendicular to both the X axis and the Y axis. With this embodiment, as shown in FIG. 1, the X axis is established along the lateral center line of the top side 1a, the Y axis along the vertical center line of the top side 1a, and the Z axis along a line perpendicular to the top side 1a (and the underside 1f) on the main body 1A of the portable content player 1. A signal acquired by the acceleration sensor 21 having sensed acceleration is converted by a sensor signal processing circuit 22 into digital data so that it can be processed by the control device 11 (CPU). After the conversion, the digital data is input to the control device 11. Given the data, the control device 11 of this embodiment computes a dynamic acceleration value representing the movement of the main body 1A along one of the X, Y and Z axes, so that actions reflecting shaking operations, to be discussed later, will be carried out. In this respect, the acceleration sensor 21 should be arranged to sense dynamic acceleration along any of the X, Y and Z axes which will at least correspond to the axial direction of shaking operations.

The portable content player 1 of the above-described structure is operated ordinarily by use of the operating elements constituting the operation device 18; the player 1 is also operated for certain actions without recourse to these operating elements when shaken vigorously in a particular direction of the main body in a previously timed manner for a predetermined number of times. What follows is a description of how the portable content player 1 is shaken for control of certain actions. The operation of shaking once the portable content player 1 in a particular direction of the main body will be called a shake or a shaking operation hereunder.

Figure 3:
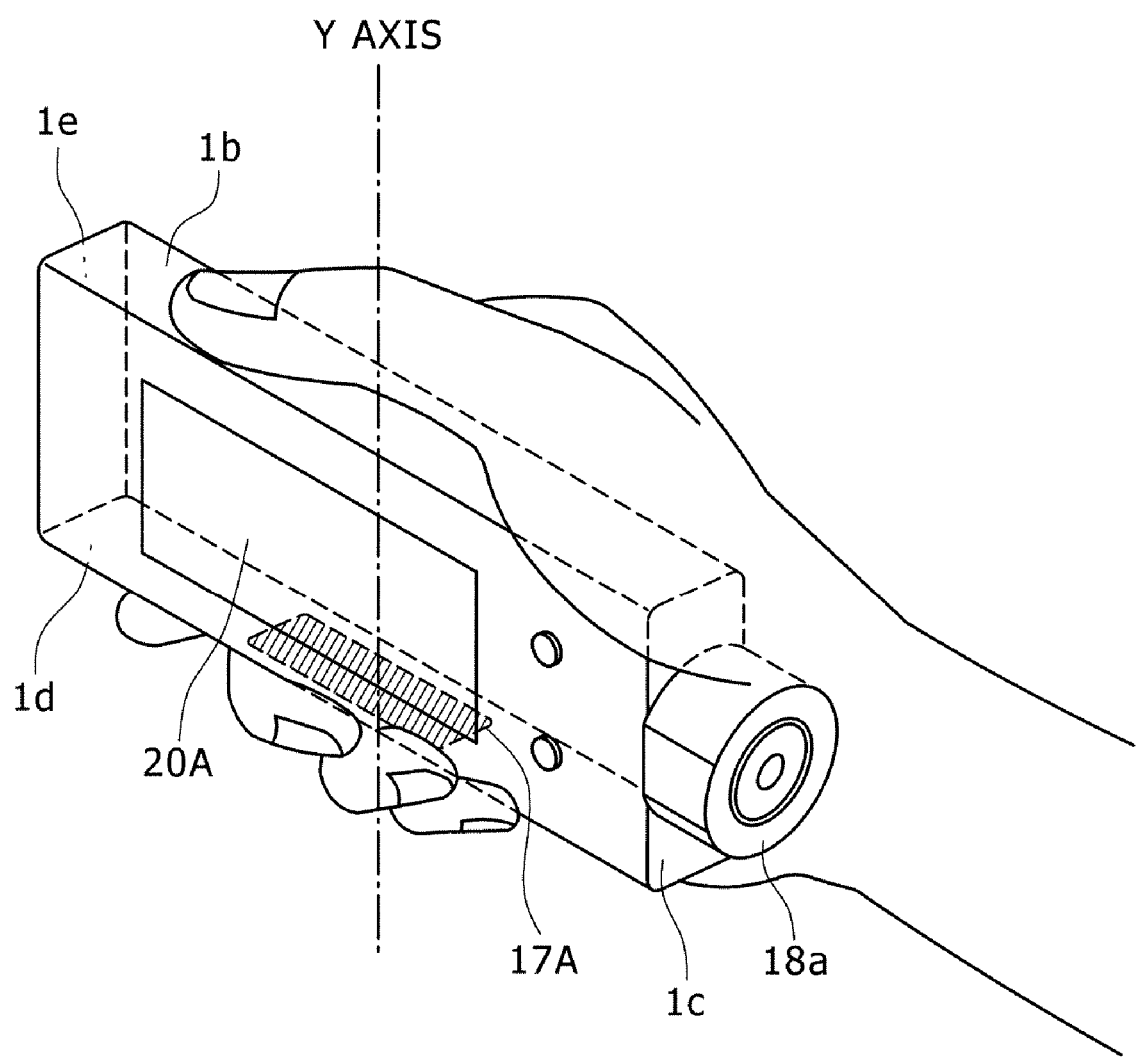
FIG. 3 is a schematic view showing how the portable content player is typically held by hand, ready for a shake.

FIG. 3 is a schematic view showing how the portable content player 1 is typically held by hand, ready for a shake. As illustrated, the portable content player 1 is gripped in such a manner that the front side 1b of the main body 1A comes on top and the back side 1d opposite to the front side 1b faces downward. In this example, the player 1 is held so that the left-hand side 1c faces the user. When oriented in this manner, the main body 1A typically held in the right hand ready for a shake lets the display screen part 20A be viewed by the user without being hidden by the palm of the hand. What is displayed on the display screen part 20A can then be seen by the user in unreversed fashion while the main body 1A is being held ready for a shake. To make a shaking operation, the user lets part of the hand holding the main body 1A touch the touch-sensitive part 17A of the back side 1d. With the main body 1A gripped as illustrated, the back side 1d is supported by the four fingers other than the thumb. That means the touch-sensitive part 17A is touched by any of the four fingers other than the thumb.

As will be discussed later, the pattern of signals to be detected by the acceleration sensor 21 in response to shaking operations is quite different from the pattern of signals that are detected usually by the sensor 21 when the user holding the portable content player 1 by hand is walking or running normally. Thus the possibility of any ordinary operation being mistaken for a deliberately performed shaking operation is very small. Still, there would be no need to discourage additional efforts to further reduce the possibility of the erroneous sensing of shaking operations. One such effort with this embodiment involves requiring the user's fingertips to touch the touch-sensitive part 17A before any shaking operation. If no fingertip is in contact with the touch-sensitive part 17A, any detection signal acquired by the acceleration sensor 21 as representative of a shaking operation will not be recognized in connection with that operation. With the shaking operation thus disabled, any erroneously triggered action is prevented.

Auxiliary controls for enabling or disabling the shaking operation could conceivably be implemented by keeping an ordinary key button pushed continuously. The pushing action on the key button, however, is more or less difficult to maintain while the user is shaking the player; the action tends to become unstable especially during a vigorous shake. With this embodiment of the invention, the user need only keep his or her fingertips in contact with the touch-sensitive part 17A. The touching action is more reliable than the push of a key button.

Figure 4:
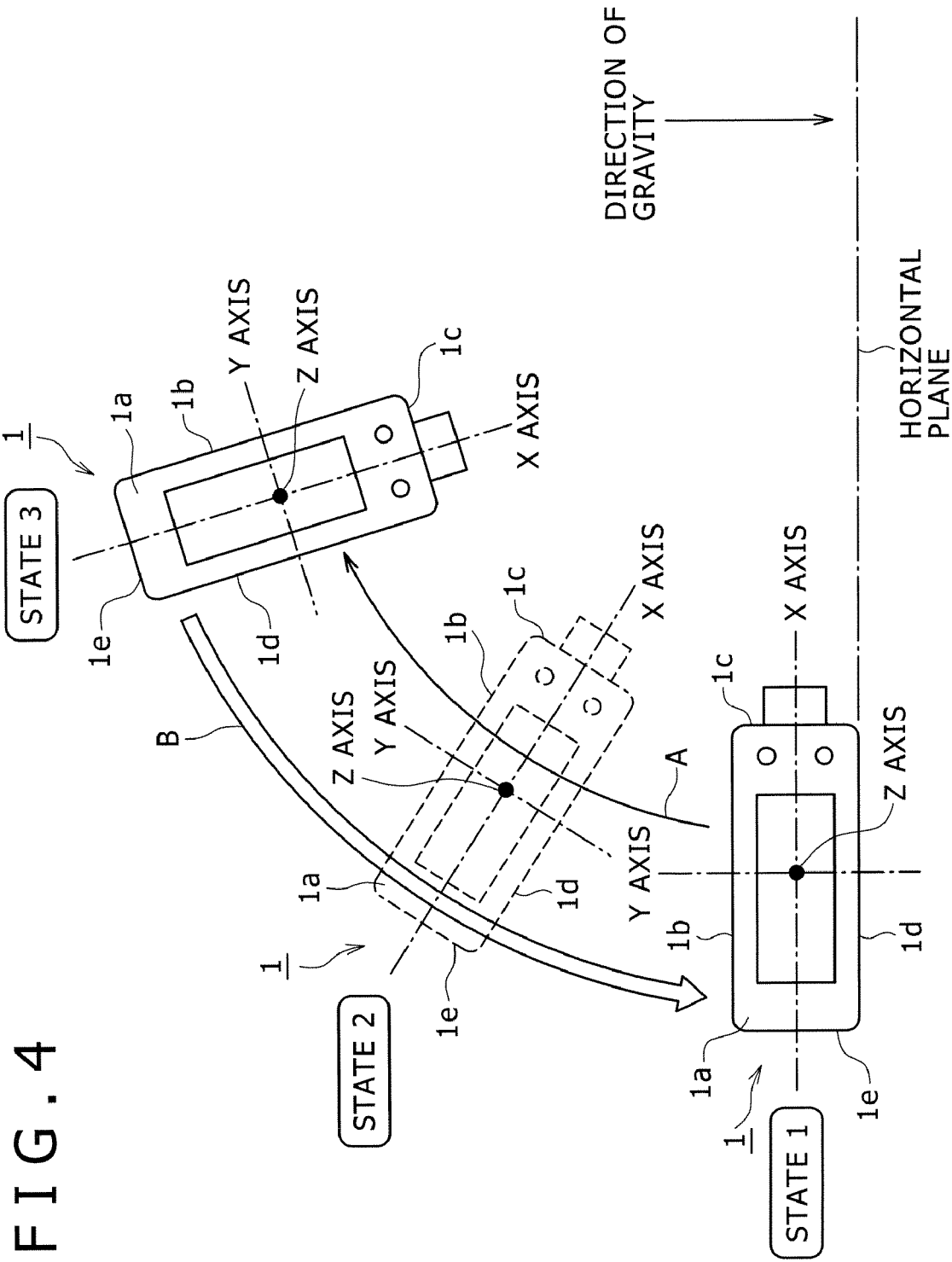
FIG. 4 is a schematic views showing a typical locus along which the portable content player may move when shaken manually as shown in FIG. 3.

FIG. 4 is a schematic views showing a typical locus along which the portable content player 1 may move when shaken manually as shown in FIG. 3. As mentioned above, a shake or shaking operation involves holding the main body 1A by hand and shaking it vigorously. A typical action resembling the shake would be one involving a clinical thermometer being shaken in a briskly centrifugal manner by a nurse after she has checked its readings.

In the example of FIG. 4, a single shaking operation is started from the condition indicated as a state 1, in which the underside if (and the top side 1a) of the main body 1A is held substantially parallel with the horizontal plane. The main body 1A of the portable content player 1 is thus taken back initially as indicated by an arrow A. The main body 1A is then moved from the state 1 to a state 3 through a state 2. The take-back is a slower motion than a release which will be described shortly. The take-back is terminated in the state 3, followed by a release in which the main body 1A is vigorously moved down from the state 3 to the state 1 by way of the state 2 in a centrifugal snap action along the X axis, as indicated by an arrow B. That is, a single shaking action is made up of a take-back and a release of the portable content player 1. The portable content player 1 is initially placed in the release starting position in a take-back, then the main body 1A of the player 1 is shaken vigorously in a release.

The portable content player 1 of this embodiment utilizes shaking operations to switch from one shuffle reproduction mode to another. Shuffle reproduction, as is well known, involves reproducing a plurality of contents not sequentially but randomly. For example, a plurality of songs constituting an album are usually reproduced sequentially. In a shuffle reproduction mode, these songs are reproduced on a random basis. In recent years, varieties of attribute information have come to be attached to content files. These attachments allow the filed contents to be sequenced in diverse ways during shuffle reproduction. Today, some content players are known to reproduce contents selectively in any one of multiple shuffle reproduction modes. The portable content player 1 of this embodiment also offers a plurality of shuffle reproduction modes to choose from. The embodiment allows the user to switch from one shuffle reproduction mode to another through shaking operations.

Figure 5:
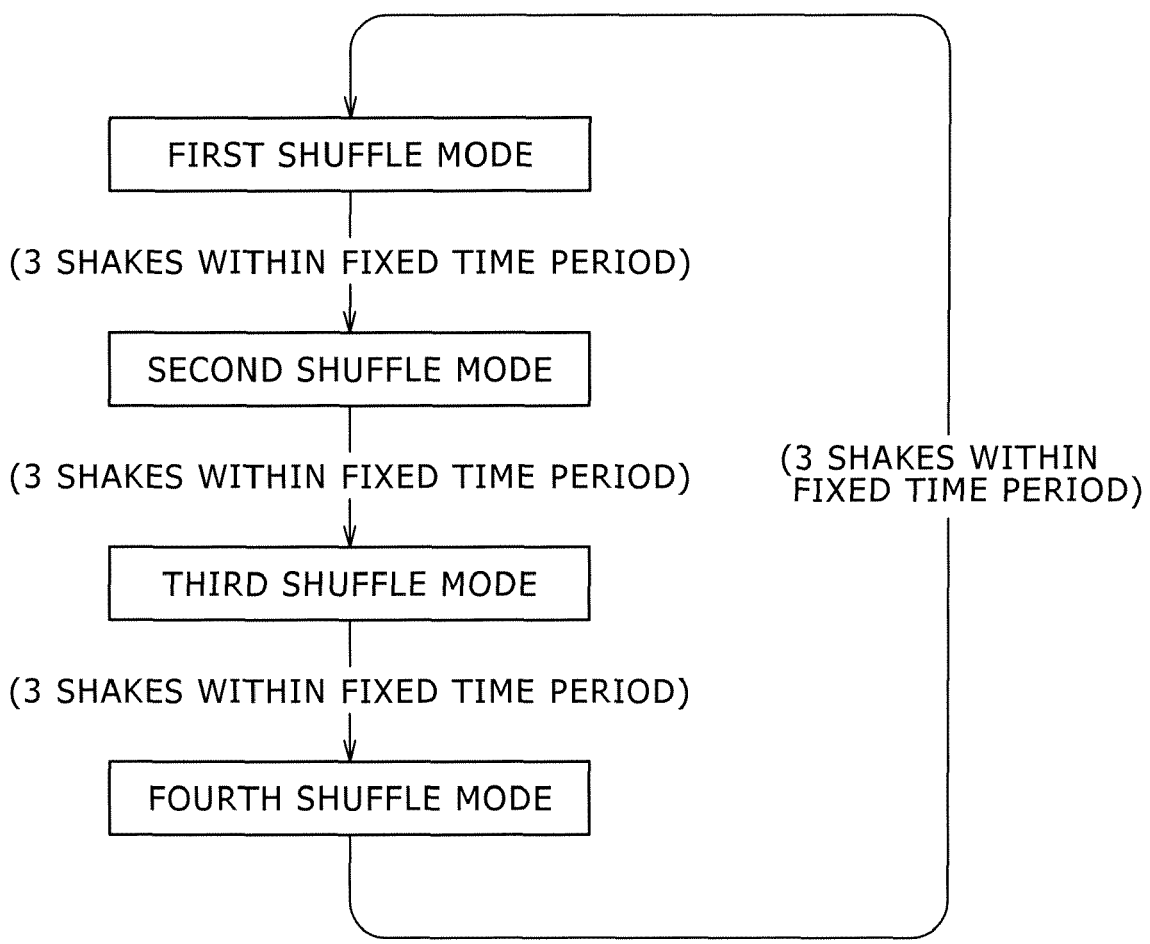
FIG. 5 is a schematic view showing how the portable content player is switched from one shuffle reproduction mode to another when shaken as depicted in FIG. 4.

FIG. 5 is a schematic view showing how the portable content player 1 of this embodiment is switched from one shuffle reproduction mode to another through shaking operations. The embodiment illustratively offers four shuffle reproduction modes, the first through the fourth. When the user wants to reproduce contents in one of the shuffle modes, the user first operates the jog dial 18a or the key button 18b or 18c to enter shuffle reproduction mode selection mode. The display screen part 20A displays an indication that shuffle reproduction mode selection mode is now in effect, as well as an indication representative of the currently selected shuffle mode as one candidate to be definitively chosen. Illustratively, the first shuffle reproduction mode may be initially presented as the candidate to be selected.

With the above condition in effect, the user holds the portable content player 1 as shown in FIG. 3, ready to shake it. For verification, it should be noted that when the portable content player 1 is held in the user's hand, part of the hand is in contact with the touch-sensitive part 17A of the back side 1d.

With shuffle reproduction mode selection mode in effect, the currently selected shuffle reproduction is replaced by another shuffle reproduction mode in a predetermined sequence every time the player 1 is shaken three times in a row within a predetermined time period. In the example of FIG. 5, every time the portable content player 1 is shaken three times in a predetermined time period, the first shuffle reproduction mode is replaced by the second shuffle reproduction mode, which is replaced by the third shuffle reproduction mode, which in turn gives way to the fourth shuffle reproduction mode. With the fourth shuffle reproduction mode currently selected, shaking the portable content player 1 three times within the predetermined time period restores the first shuffle reproduction mode. That is, the first through the fourth shuffle reproduction mode are switched in cyclical fashion by every three shaking operations within the predetermined time period.

After one of the shuffle reproduction modes is selected as described above, it is necessary for the user to perform an operation to get content reproduction started in the selected mode. Conceivably, the user might give a reproduction starting instruction by operating the jog dial 18a or key button 18b or 18c. This embodiment, however, is arranged to get reproduction started in the currently selected shuffle reproduction mode if no shaking operation is performed effectively over a predetermined time period (e.g., about 3 seconds). That is, the inaction (i.e., no shaking) during the predetermined time period constitutes an operation that finalizes the current selection of the shuffle reproduction mode and starts up shuffle reproduction in that mode.

As explained above, this embodiment of the invention allows illustratively a desired shuffle reproduction mode to be selected when the user holds the main body 1A of the portable content player 1 by hand in a predetermined orientation and shakes it vigorously. This eliminates the need for the user to operate the jog dial 18a or key buttons 18b and 18c for switching from one shuffle reproduction mode to another, whereby the ease of use of the portable content player 1 is enhanced. The user carrying the portable content player 1 may be typically walking, jogging, or doing something that often makes it difficult for the user to manipulate small operating elements calmly and accurately. In such cases, simply shaking the portable content player 1 for effecting desired actions appreciably improves its ease of use. The increase in the ease of use is all the more evident since the selected shuffle reproduction mode can be started without having to manipulate such operating elements as the jog dial 18a or key buttons 18a and 18c. Vigorously shaking the main body of the portable content player 1 constitutes a manipulation that is not usually done with this type of such equipment. This gives the user a heightened sense of entertainment whenever using the portable content player 1. In particular, when called on to perform a predetermined number of shaking operations for effecting shuffle reproduction, the user may well be amused by the simulated action of symbolically randomizing the sequence in which the contents of interest are to be reproduced.

Described below are the technical arrangements of the invention for implementing selective switchover from one shuffle reproduction mode to another in response to the above-described shaking operation. Whether or not the shaking operation described above in reference to FIG. 4 has been performed is determined by the control device 11 on the basis of an acceleration sensing signal acquired from the acceleration sensor 21 via the sensor signal processing circuit 22.

The signal generated by the acceleration sensor 21 in response to the shaking operation is described first. As discussed above, the portable content player 1 moves along the locus shown in FIG. 4 when held by hand and shaken as illustrated in FIG. 3. During such movements, acceleration is effectively sensed along the X and Y axes out of the three axes (including the Z axis) established on the portable content player 1. In this case, the force exerted on the main body of the portable content player 1 is represented by a vector that combines the motion on the X axis with that on the Y axis. Ideally, the portable content player 1 should move very little along the Z axis. Even if the player 1 does move along the Z axis, the acceleration value in that direction is negligible compared with the acceleration value on, say, the Y axis. This embodiment is thus arranged to sense acceleration along the Y axis rather than on the X axis for determining the shaking operation of FIG. 4. More specifically, the acceleration in the Y axis direction tangential to the locus of the take-back and release indicated by the arrows A and B in FIG. 4 is sensed to determine the occurrence of a shaking operation. It would alternatively be possible to utilize a sensing signal representing acceleration in the X axis direction. However, sensing the value of acceleration along the Y axis is considered far more advantageous for determining the shaking operation because the closer to the state 1 upon release, the more dominant the Y axis vector component as the direction in which the acceleration of the player is exerted.

Figure 6A:
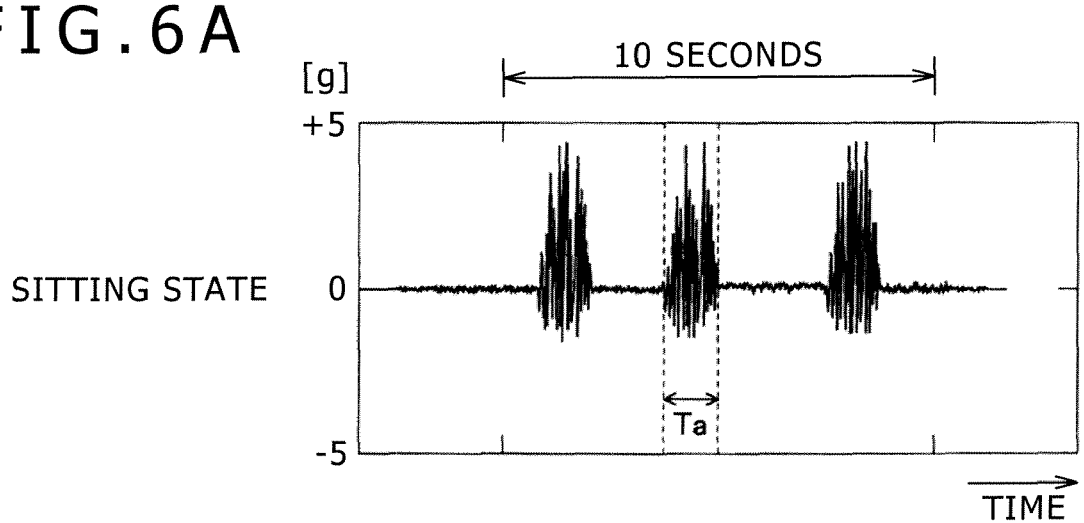
FIGS. 6A, 6B and 6C are waveform charts representative of acceleration values detected from shaking operations.
Figure 6B:
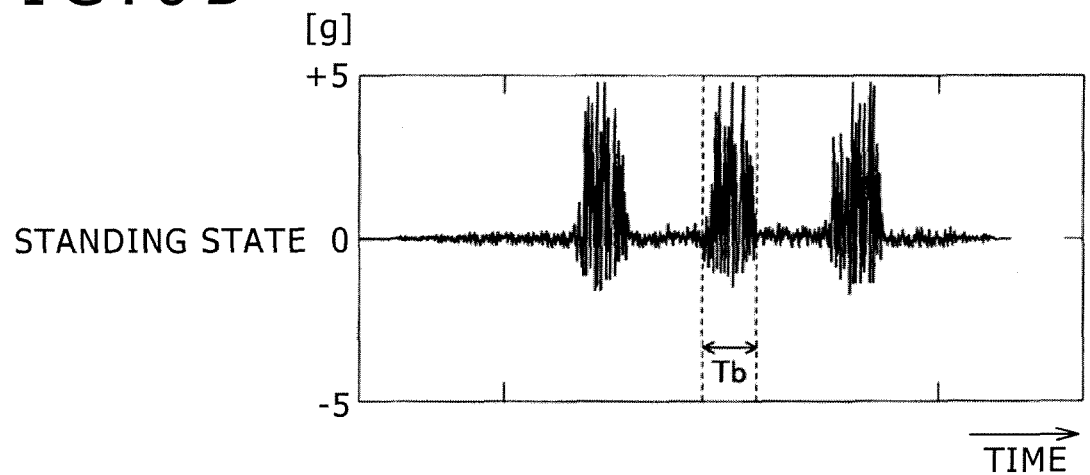
Figure 6C:
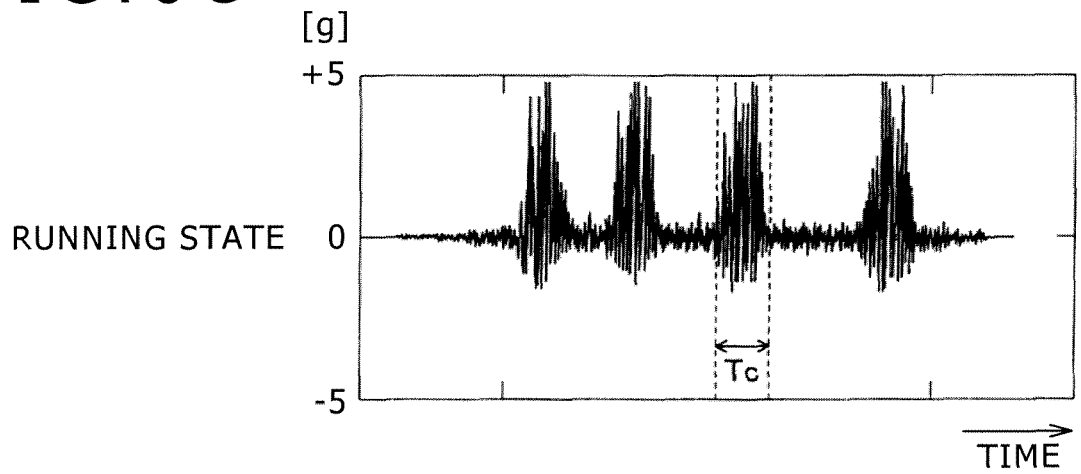

FIGS. 6A, 6B and 6C are waveform charts representative of acceleration values detected from shaking operations performed by the tester (i.e., user) holding the portable content player 1 by hand and shaking it as illustrated in FIGS. 3 and 4. FIG. 6A, 6B and 6C show the typical waveforms in effect when the user is sitting, standing, and running, respectively. These waveforms each denote a sensing signal acquired to represent acceleration only along the Y axis out of the three axes that may be conceivably adopted by the acceleration sensor 21 for determining the shaking operation. In FIGS. 6A, 6B and 6C, a single shaking operation is represented by each of waveform segments Ta, Tb and Tc. As indicated, each waveform segment denotes an acceleration value which, within a time period of less than one second, is found to rise abruptly to as high as 5 G in absolute terms (positive value in this case) in response to a shaking operation. As illustrated, FIG. 6A represents a total of six shaking operations sensed by the embodiment; FIG. 6B, three shaking operations; and FIG. 6C, five shaking operations. That is, those portions of the waveforms in FIGS. 6A, 6B and 6C in which no shaking operation is shown performed represent acceleration values in effect when the user holding the portable content player 1 is normally sitting, walking, and running, respectively. The acceleration values sensed in the absence of a shaking operation indicate that their amplitude is the smallest in the sitting state of FIG. 6A, larger in the standing state of FIG. 6B, and the largest in the running state of FIG. 6C. However, even in the running state of FIG. 6C, the waveform from shaking operations is shown presenting a significantly large amplitude compared with the amplitude under that normal condition.

As described, the signal waveform of acceleration values obtained from shaking operations is quite different from the waveforms acquired from normal movements of the user carrying the main body of the portable content player 1, even when the user is engaged in a somewhat rigorous physical activity such as running. Given such singularly of the waveform from shaking operations, it will be appreciated that the detection of a shaking operation based on the sensing signal from the acceleration sensor 21 is not particularly difficult.

FIG. 7 is a graphic representation showing a temporally enlarged waveform constituting a part of any one sensing signal waveform in FIGS. 6A, 6B and 6C and obtained by the acceleration sensor 21 in response to a shaking operation. As illustrated in FIG. 7, the waveform acquired in response to a single shaking operation may be considered to be formed by a part corresponding to the take-back period and a part denoting the subsequent release period. During the take-back period, the portable content player 1 is moved in the direction indicated by the arrow A in FIG. 4, typically at a lower velocity than during the release period. The movement is seen generating a negative acceleration value along the Y axis. Upon release following the take-back period, the portable content player 1 is moved in the direction indicated by the arrow B, i.e., in the direction opposite to the direction of the arrow A in FIG. 4. This movement is seen generating a positive acceleration value sensed in the Y axis direction. Because the release action involves a high velocity with considerable acceleration added, the waveform from the release period is more steeply inclined and presents a higher acceleration peak than the waveform from the take-back period.

Figure 8:
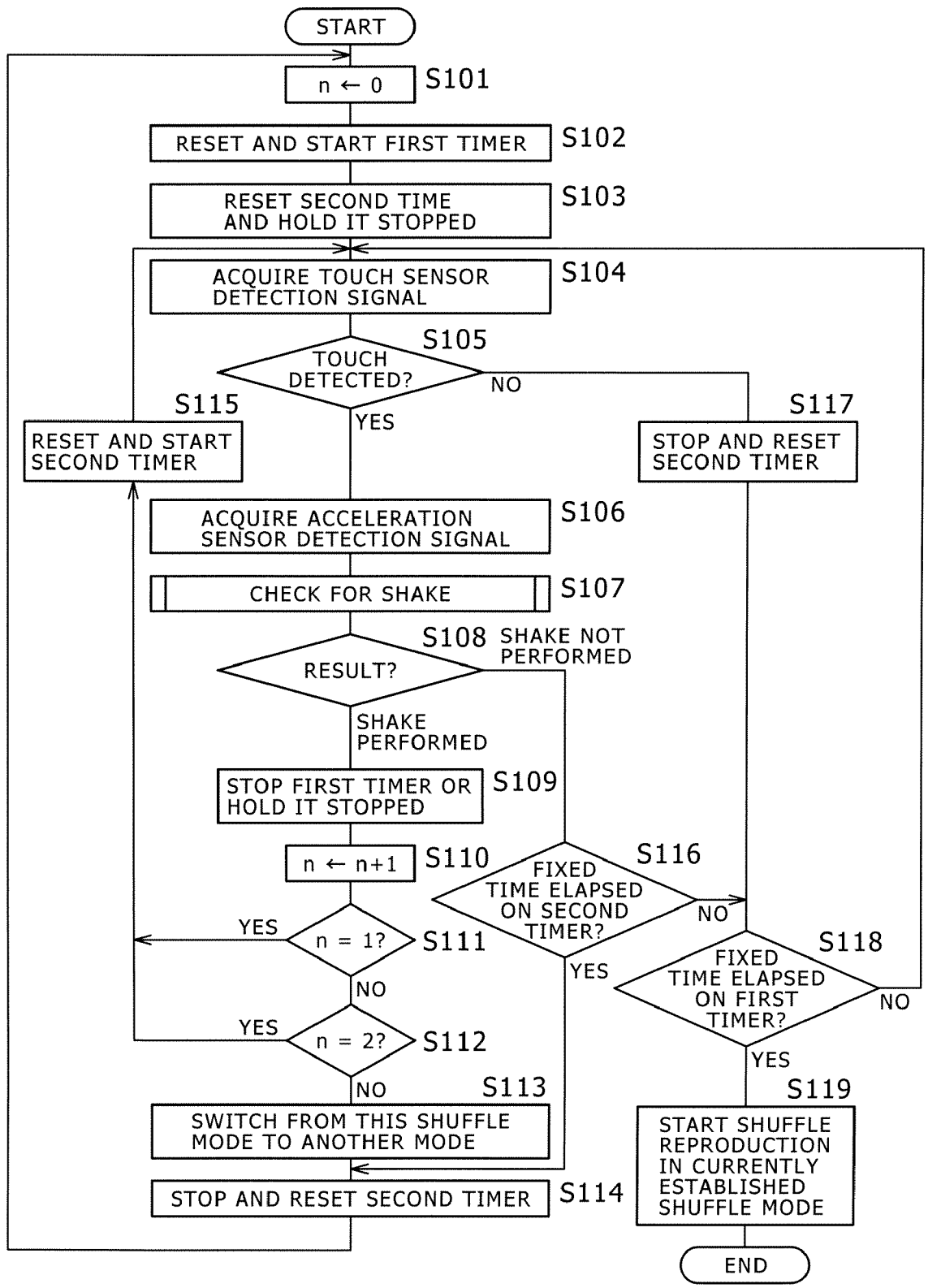
FIG. 8 is a flowchart of steps constituting a procedure performed by a control device of the embodiment when it is shaken.

FIG. 8 is a flowchart of steps constituting a procedure performed by the control device 11 of the embodiment when a shuffle reproduction mode is selected through shaking operations. This procedure may be considered a control processing procedure carried out by the CPU as part of the hardware of the control device 11 loading a relevant program from the nonvolatile memory device 12. Rather than being placed in the nonvolatile memory device 12 in the manufacturing stage, the program may be kept alternatively on a removable storage medium and installed from there into the portable content player 1 upon use. As another alternative, the program may be held in a server or like storage equipment on a network and downloaded over the network for installation into the portable content player 1.

Figure 9:
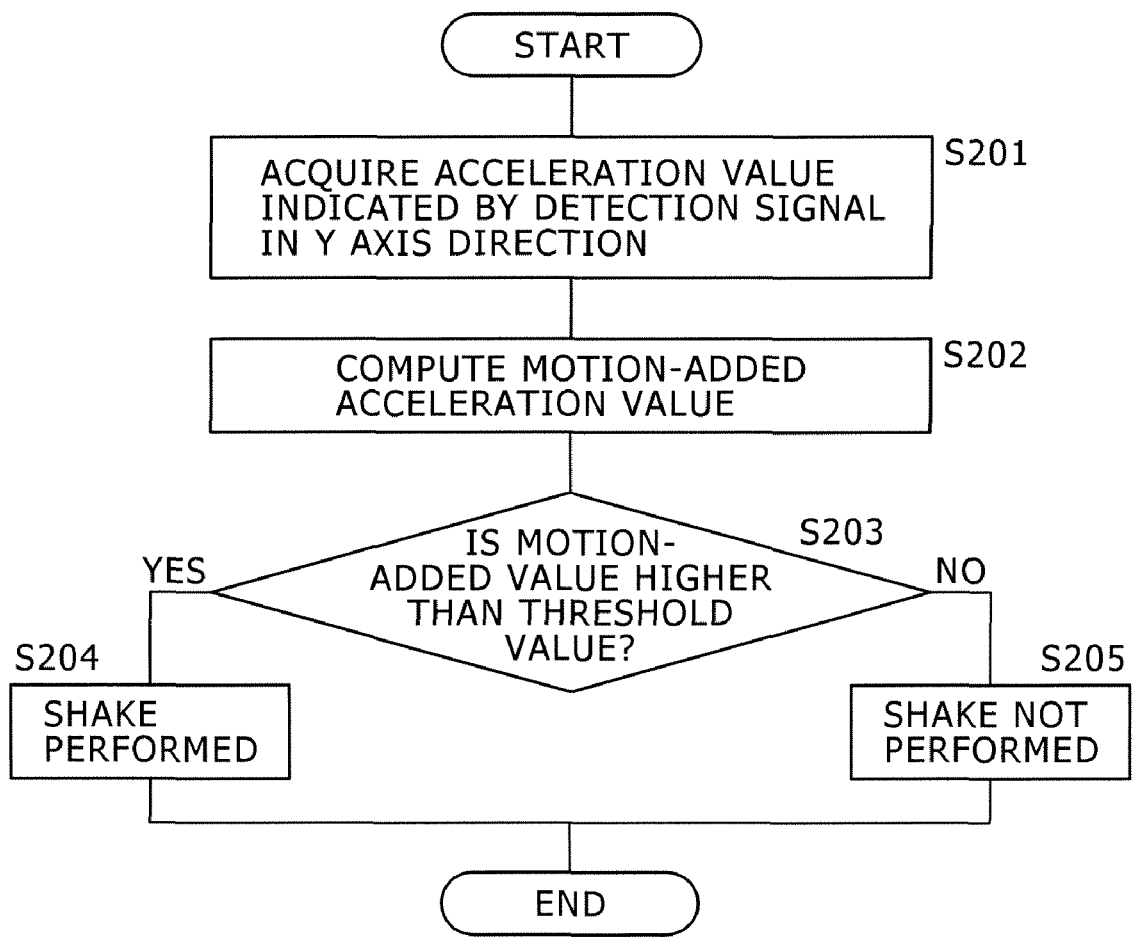
FIG. 9 is a flowchart of steps constituting a procedure for determining whether a shaking operation is performed as part of the procedure in FIG. 8.
Figure 10:
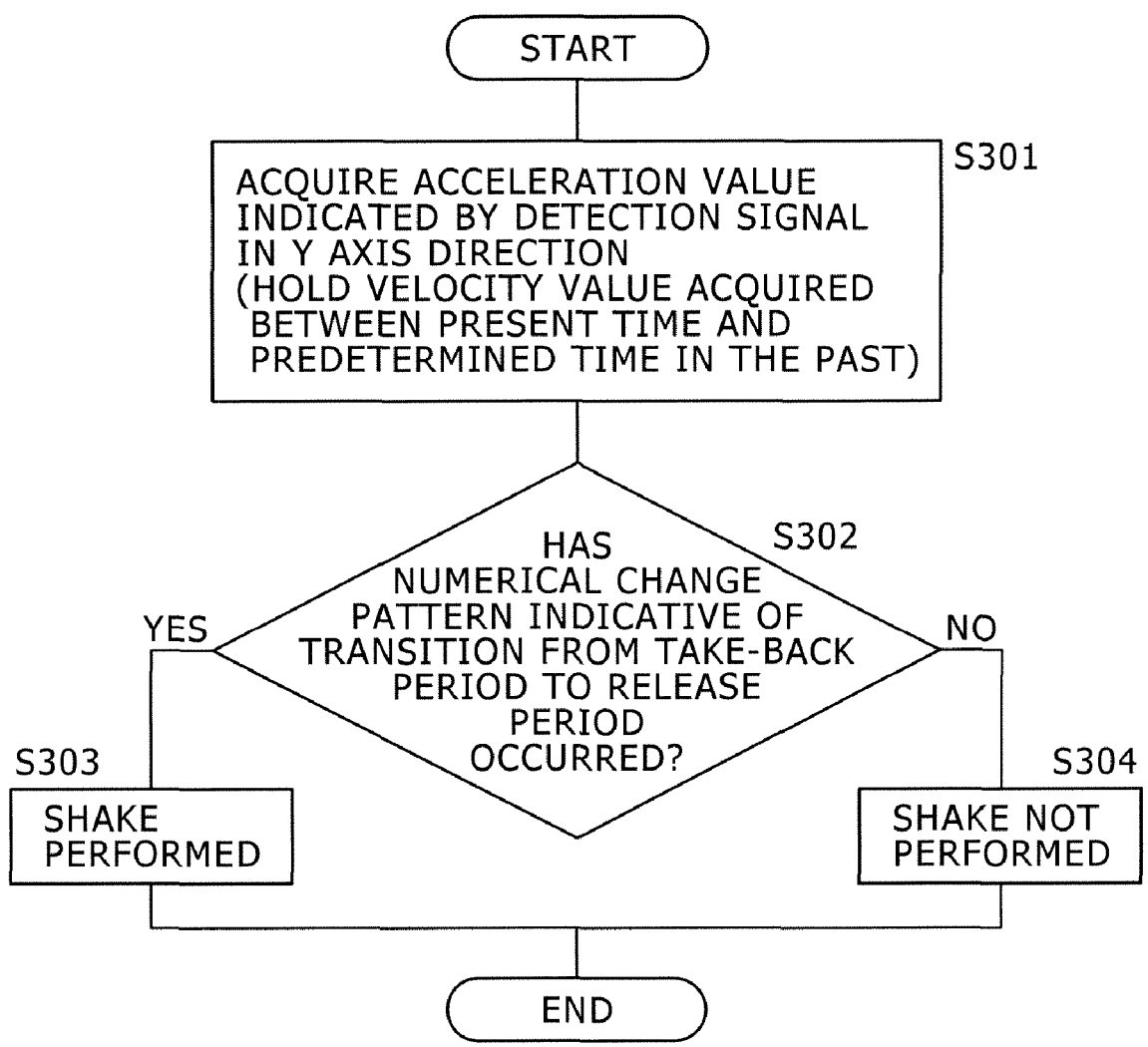
FIG. 10 is a flowchart of steps constituting another procedure for determining whether a shaking operation is performed as part of the procedure in FIG. 8.

As a further alternative, suitable hardware may be devised to carry out the processes that will be discussed below with reference to FIGS. 8, 9 and 10.

Typically, the portable content player 1 is operated in a predetermined manner so as to enter shuffle reproduction mode selection mode. In response, the control device 11 establishes shuffle reproduction mode selection mode and starts carrying out the steps shown in FIG. 8. In step S101 of FIG. 8, the control device 11 substitutes "0" into a variable "n." The variable "n" represents the number of shaking operations detected over a predetermined time period. In step S102, using its own clock function, the control device 11 resets and starts a first timer. As mentioned above, this embodiment is arranged to get reproduction started in the currently selected shuffle reproduction mode if no shaking operation is performed effectively over a predetermined time period (e.g., about 3 seconds). The first timer is used to set and measure the time period in which no shaking operation is to be effectively carried out preparatory to getting shuffle reproduction started, as will be discussed later. In step S103, the control device 11 resets a second timer different from the first timer and sets an initial count value on the second timer. At this point, the second timer is kept stopped. The second timer is used to set and measure the time period within which three shaking operations are to be carried out consecutively as described above preparatory to switching from one shuffle reproduction mode to another. The actual time period to be measured by the second timer ranges from the time a shaking operation is first made, to the time the next shaking operation is performed, as will be discussed later.

In step S104, a sensing signal is acquired from the touch sensor 17. In step S105, a check is made to determine whether the sensing signal obtained in step S104 indicates the presence of a fingertip contact. As already mentioned, the sensing signal coming from the touch sensor 17 and indicative of the touch signifies that the user's fingertips are in contact with the touch-sensitive part 17A. If the result of the check in step S105 is negative, step S117 is reached. In step S117, with the second timer continuously measuring time following the earlier execution of step S115 (to be discussed later), the control device 11 stops and resets the second timer. Step S117 is followed by step S118 in which a check is made to determine whether the predetermined time period has elapsed on the first timer. If the result of the check in step S118 is negative, then step S104 is reached again. If the result of the check in step S118 is affirmative, that means no shaking operation has been effectively performed for the predetermined time period, as will be described later. In this case, shuffle reproduction is started in step S119 in the currently selected shuffle reproduction mode. The contents to be randomly reproduced may be determined by any known randomizing method such the use of random numbers. If the result of the check in step S105 is affirmative, then step S106 and subsequent steps are carried out.

In step S106, a sensing signal output by the acceleration sensor 21 is acquired through the sensor signal processing circuit 22. In practice, step S106 is carried out at predetermined intervals as long as shuffle reproduction mode selection mode is in effect. In step S107, a check is made to determine whether a shaking operation has been performed on the basis of the acquired sensing signal.

Two typical decisions made in step S107 are described below in reference to FIGS. 9 and 10. For the steps of FIG. 9 to be carried, it is assumed that in step S106 sensing signals representative of acceleration along the X, Y and Z axes are acquired and that the sensing signal denoting the acceleration along the Y axis is selectively utilized by this embodiment as discussed above. In step S201 of FIG. 9, the acceleration value represented by the sensing signal of the acceleration along the Y axis is selectively acquired out of the values denoted by the sensing signals of the acceleration along the X, Y and Z axes.

In step S202, the acceleration value acquired in step S201 is used as the basis for computing a motion-added acceleration value along the Y axis. As mentioned above, the process of step S106 in FIG. 8 is repeated at constant intervals while shuffle reproduction mode selection mode is in effect. It follows that step S201 subordinate to step S107 following step S106 is also carried out at predetermined intervals. In other words, the acceleration value along the Y axis is acquired at constant intervals. The motion-added acceleration value is an acceleration value obtained by adding up a predetermined number of acceleration values that have been most recently acquired in step S201.

In step S203, a check is made to determine whether the motion-added acceleration value computed in step S202 exceeds a predetermined threshold value. Since the motion-added acceleration value is the sum of a fixed number of the most recent acceleration values along the Y axis, the larger the motion-added acceleration value, the greater the rate of change (i.e., inclination) of acceleration along the Y axis per unit time. The threshold value for use in step S203 is suitably established so that the motion-added acceleration value exceeding the threshold will indicate the emergence of an acceleration value change pattern representative of the acceleration during the release period shown in FIG. 7.

If the result of the check in step S203 is affirmative under the above conditions, then step S204 is reached in which a single shaking operation is recognized. If the result of the check in step S203 is negative, then step S205 is reached in which no shaking operation is detected. As described, the shaking operation determining process shown in FIG. 9 is based on the assumption that the waveform change of the acceleration value corresponding to the release period is singularly large in terms of peaks and inclinations compared with the normal waveform changes. The comparative aspect of the waveforms was already discussed illustratively in reference to FIG. 6A through 6C.

The steps in FIG. 10 will now be described. In step S301, as in step S201 of FIG. 9, the acceleration value of the sensing signal representing the acceleration along the Y axis is selectively acquired and retained. At this point, the oldest of the acceleration values acquired between the present time and a predetermined point in time in the past is discarded. That is, in step S301, the acceleration values from a fixed time period in the past are always retained. In step S302, a check is made to determine whether the change pattern characteristic of transition from the take-back period to the release period discussed above in reference to FIG. 7 has emerged out of the patterns of changes obtained in step S301 in the acceleration values ranging from the present time to the predetermined point in time in the past. In other words, the shaking operation determining process of FIG. 10 is based on the assumption that the shaking operation is reciprocated in a certain direction (ideally, along a circular arc to which the Y axis is tangential) during transition between the take-back and the release and that a distinctive change pattern characteristic of the acceleration values reflecting the reciprocal motion can be detected. That is, as explained above in reference to FIG. 7, there should be detected the change pattern in which a gradual increase in the absolute value of acceleration is observed in the negative direction during the initial take-back period, followed by an abrupt surge of acceleration in the positive direction during the subsequent release period. The detection of this pattern may typically require preparing reference information representative of the above-described standard change pattern of acceleration values from the take-back period to the release period. The rate of approximation may then be obtained according to suitable rules between the reference information and the patterns of changes in the acceleration values acquired over the fixed time period. If the obtained rate of approximation is found in excess of a predetermined threshold value, then a shaking operation is determined to have been carried out. When the result of the check in step S302 is affirmative, step S303 is reached and a shaking operation is detected. If the result of the check in step S302 is negative, then step S304 is reached and no shaking operation is recognized.

Following the shaking operation determining process of step S107 described above in reference to FIGS. 9 and 10, step S108 back in FIG. 8 is reached. Step S108 branches to one of two subsequent steps depending on the result of step S107. If the shaking operation is detected in step S107, then step S109 is reached; if no shaking operation is detected in step S107, then step S116 is reached.

Just before step S109 is reached, the first timer is in one of two states: either it continues to measure time or is being stopped. If the first timer is measuring time when step S109 is reached, then the first timer is stopped then and there; if the first timer is being stopped when step S109 is attained, then the stopped state is maintained. In either case, the first timer is stopped in step S109. In step S110 following step S109, the variable "n" is incremented by "1."

In step S111, a check is made to determine whether the variable "n" is currently "1." If the result of the check in step S111 is affirmative, then step S115 is reached and the second timer is reset before getting started. Control is then passed from step S115 back to step S104. If the result of the check in step S111 is negative, then step S112 is reached. In step S112, a check is made to determine whether the variable "n" is currently "2." If the result of the check in step S112 is affirmative, then step S115 is reached again as in the case of the check of step S111 resulting in the affirmative, the second timer 2 is reset and started, and step S104 is reached again. If the result of the check in step S112 is negative, then step S113 is reached.

The check of step S112 results in the negative if the variable "n" turns out to be "3." The variable indicates that three shaking operations have been performed consecutively within the predetermined time period. In his case, step S113 is reached and the currently selected shuffle reproduction mode is set to be replaced by the next mode. Thereafter, the second timer is stopped and reset before step S101 is reached again.

If no shaking operation is determined to have occurred in step S107, then step S108 is followed by step S116. In step S116, a check is made to determine whether the time elapsed on the second timer exceeds a predetermined time period. If the result of the check in step S116 is affirmative, step S114 is reached; if the check of step S116 results in the negative, then step S118 is reached.

What follows is a description of how the major steps outlined in FIG. 8 are typically matched with actual operations. When the user holds the player by hand as shown in FIG. 3 ready to shake it, the touch sensor 17 senses the contact with the user's fingertips in steps S104 and S105. Then steps S106 and S107 are repeated to determine the presence of a shaking operation. If a first shaking operation is detected, then step S108 is followed by step S109. In step S110, the variable "n" is incremented by "1" so that "n"=1. The check of step S111 then results in the affirmative so that step S115 is reached and the second timer is reset and started, before step S104 is reached again. Thereafter, if the predetermined time elapses on the second timer without the next shaking operation being detected, then the check of step S116 results in the affirmative and control is returned from step S114 to step S101. The variable "n" is reset to "0." By contrast, if another shaking operation is performed before the predetermine time elapses on the second timer, then control is passed from step S112 to step S115. The second timer is then reset and started from count zero. That is, even when the shaking operation has been performed once (or twice), the operation so far is invalidated if yet another shaking operation is not carried out within the time period corresponding to the time count on the second timer. If another shaking operation is performed within the time count on the second timer following the first (or the second) shaking operation, the shaking operation count (i.e., variable "n") is incremented from "1" to "2" or from "2" to "3" in step S110. When the shaking operation count eventually reaches "3", control is passed from step S112 to step S113 and the currently selected shuffle reproduction mode is set to be replaced by the next mode, as discussed above.

As described, every time the first or the second shaking operation is performed, the second timer is reset and started. That is, the current shuffle reproduction mode is replaced by the next mode only if the first shaking operation is followed within the predetermined time period (i.e., time count on the second timer) by the second shaking operation which in turn is followed by the third shaking operation also within the predetermined time period (again the time count on the second timer). In this case, the time period in which the first through the third shaking operation are to be carried out may be regarded as double the time count on the second timer. When three shaking operations are found to take place within that time period, the condition for switching from one mode to another is considered to be met by this embodiment of the invention.

Following the change from one shuffle reproduction mode to another, the user may keep gripping the player as shown in FIG. 3 (i.e., with the fingertip contact sensed by the touch sensor 17) and doing nothing else. In this case, steps S104, S105, S106, S107, S108, S116, and S118 in FIG. 8 are repeated until the result of the check in step S118 turns out to be affirmative. When the result of the check in step S118 becomes affirmative with the time count on the first timer exceeding a threshold value, step S119 is reached and shuffle reproduction is started. That is, when the user simply holds the portable content player 1 by hand for at least a predetermined time period (i.e., time count on the first timer) without shaking it, reproduction is started in the currently selected shuffle reproduction mode. Suppose that after the current shuffle reproduction mode is replaced by the next mode, the user detaches his or her fingertips from the touch-sensitive part 17A. In that case, steps S104, S105, S117 and S118 of FIG. 8 are repeated until the result of the check in step S118 becomes affirmative. When the check of step S118 results in the affirmative, shuffle reproduction is started in step S119. At this point, reproduction is started in the currently selected shuffle reproduction mode after the user holding the portable content player 1 by hand has kept his or her fingertip off the touch-sensitive part 17A for the predetermined time period (i.e., time count on the first timer). In this case, control is passed from step S105 to step S117 so that step S106 and subsequent steps are skipped. Shuffle reproduction in the newly selected mode is thus invalidated while no part of the user's hand is in contact with the touch-sensitive part 17A.

Figure 11:
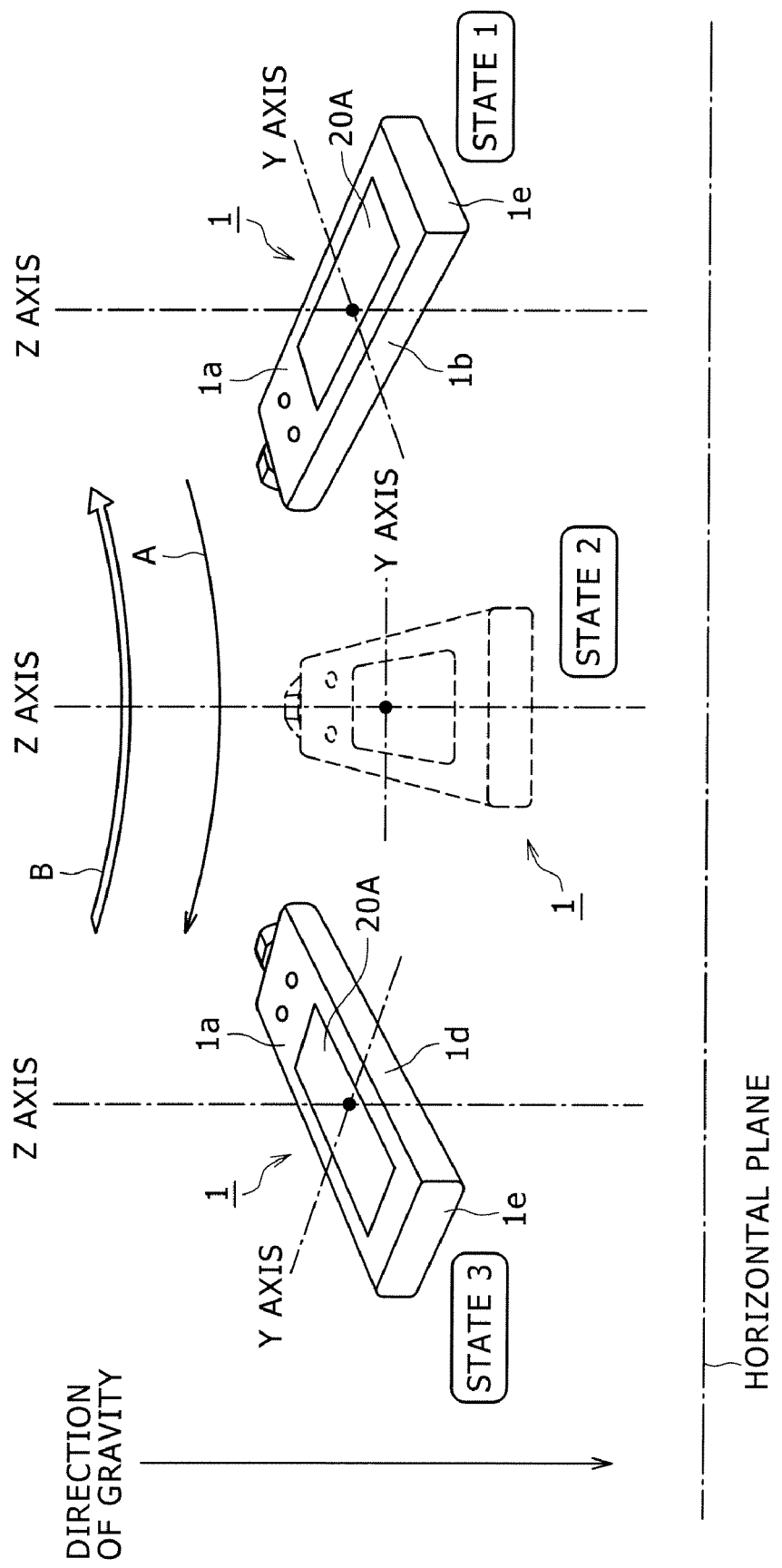
FIG. 11 is a schematic view showing how the embodiment is shaken in a different manner.

The description of the processing so far has been based on the assumption that with the player gripped as shown in FIG. 4 and shaken as illustrated in FIG. 4, the Y axis of the main body 1A is formed in tangential relation to the locus produced by the take-back and release indicated by the arrows A and B and that the Z axis is always approximately parallel with the horizontal plane. Alternatively, there may be conceived a variation in which, as depicted in FIG. 11, the Y axis is substantially parallel with the horizontal plane and the Z axis is approximately perpendicular to the horizontal plane while the main body 1A is shaken in such a manner that its Y axis is tangential to the same locus formed by the taken-back and release. In the operations of FIGS. 4 and 11, the direction in which the main body 1A is shaken is the same. The difference lies in the orientation of the main body 1A relative to the horizontal plane (i.e., direction of gravity). The different orientations of the main body 1A relative to the horizontal plane during the shaking operation may be treated by this embodiment of the invention as follows:

As one way of handling the orientation of the main body 1A, the user's motion may be construed as the same shaking operation as long as the main body 1A itself is oriented in the same direction throughout the take-back and release phases of the operation regardless of how the main body 1A is positioned relative to the horizontal plane. For example, in each of the cases of FIGS. 4 and 11, if three shaking operations have been performed successively within the predetermined time period, then the current shuffle reproduction mode is replaced by the next mode. This arrangement may be implemented illustratively by carrying out the steps of FIGS. 8 and 9 as described above on the basis of dynamic acceleration values sensed by the acceleration sensor 21 along the Y axis.

As another way of handling the orientation of the main body 1A, the user's movement may be matched with a different result depending on how the main body 1A is oriented relative to the horizontal plane. For example, when the user shakes the main body 1A as shown in FIG. 4, the shuffle reproduction modes may be switched cyclically as indicated in FIG. 5. When the user shakes the main body 1A as illustrated in FIG. 11, the shuffle reproduction modes may also be switched cyclically but in reverse order to the way they are switched in FIG. 5. These actions of the portable content player 1 reflecting different shaking operations are to be implemented by detecting not only the execution or nonexecution of a shaking operation but also the orientation of the main body 1A relative to the horizontal plane (i.e., direction of gravity) during the shaking operation. This arrangement may be brought about illustratively by having the acceleration sensor 21 detect the inclination of any one of the X, Y ad Z axes relative to the horizontal direction (direction of gravity). There are known acceleration sensors designed to react not only to dynamic acceleration but also to static acceleration (i.e., gravitational acceleration of the earth). The use of one such device with its ability to respond to static acceleration makes it possible to sense inclination angle along each of the axes relative to the horizontal plane. That is, in order to detect the orientation of the main body 1A with respect to the horizontal plane (direction of gravity), the acceleration sensor 21 need only have the capability of responding to static acceleration.

Given a sensing signal from one such static acceleration-capable acceleration sensor 21, the inclination angle along at least one of the X, Y and Z axes may be detected and the acquired angle may be used to determine the orientation of the main body 1A relative to the horizontal plane. Illustratively, if the inclination angle along the Z axis is arranged to be detected and if the detected angle turns out to be approximately parallel with the horizontal plane, then the main body 1A is considered being shaken while oriented as shown in FIG. 4. If the detected inclination angle is found approximately perpendicular to the horizontal plane (i.e., parallel with the direction of gravity), then the main body 1A is considered being shaken while oriented as depicted in FIG. 11. Where the inclination angle along the Y axis is arranged to be detected, an abrupt change found in the detected inclination angle indicates that the main body 1A is being shaken while oriented as shown in FIG. 4. If the detected inclination angle along the Y axis remains substantially unchanged indicating an approximate parallelism with the horizontal plane, that means the main body 1A is being shaken while oriented as illustrated in FIG. 11. This is how the orientation of the main body 1A can be typically detected.

Figure 12:
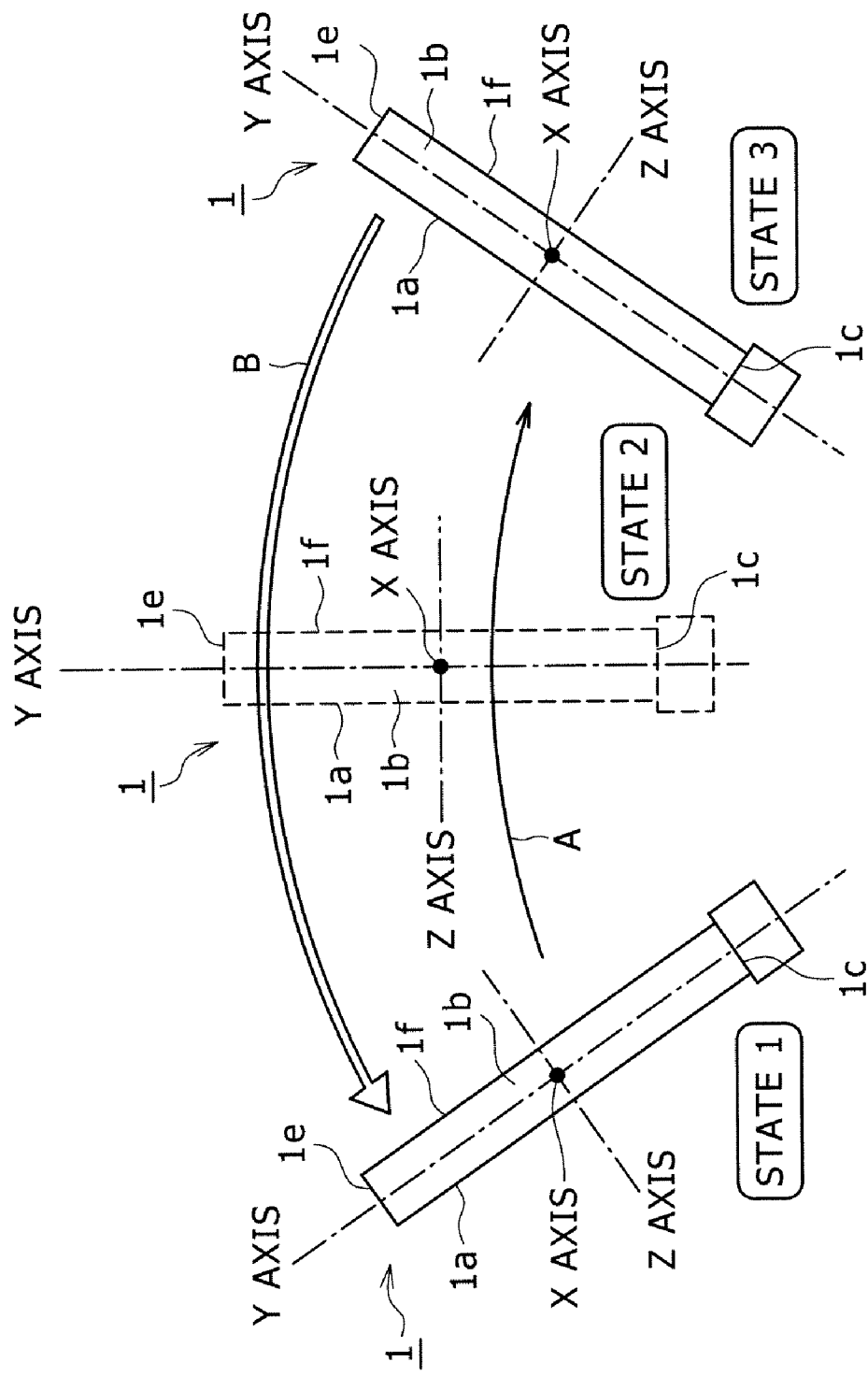
FIG. 12 is a schematic view showing how the embodiment is shaken in another different manner.

In each of the examples described above, the Y axis remains tangential to the locus of the main body 1A being shaken, while the different orientations of the main body 1A relative to the horizontal plane are used to determine different shaking operations. Alternatively, different directions of the motion of the main body 1A itself may be interpreted to determine different shaking operations. More specifically, what is shown in FIG. 12 is an example contrasted with the shaking operation shown in FIGS. 4 and 11. In the shaking operation of the main body 1A in FIG. 12, the Z axis is tangential to the locus of the movement. FIG. 12 is a plan view in which the portable content player 1 being shaken is viewed from above. The main body 1A is shown shaken in such a manner that its X axis is approximately in parallel with the horizontal plane. When dynamic acceleration is detected illustratively along the Z axis during the shaking operation of FIG. 12, the change pattern discussed above in reference to FIGS. 6A through 7 emerges from the acceleration values. By contrast, such a pattern does not occur in the acceleration values measured along the Z axis during the shaking operation of FIGS. 4 and 11. These differences in output from the acceleration sensor 21 may be used to distinguish the shaking operation in FIGS. 4 and 11 from the operation in FIG. 12.

As described, the shaking operation of this embodiment need not be limited to the one defined by the moving direction of the main body 1A itself shown in FIGS. 3 and 4 and by the orientation of the main body 1A relative to the horizontal plane; shaking operations defined otherwise may also be adopted. Illustratively, two types of shaking operation may be defined by moving the main body 1A bidirectionally along any one axis. In the shaking operation of FIG. 4, for example, the take-back direction is shown oriented toward the front side 1b and the release direction toward the back side 1d. Conversely, the take-back direction may be oriented toward the back side 1d and the release direction toward the front side 1b in another shaking operation. The two different shaking operations are distinguished illustratively by verifying the polarity of acceleration values sensed by the acceleration sensor 21. If the waveforms of the acceleration values sensed from the shaking operation in FIG. 4 appear as illustrated in FIGS. 6A through 7, then reversing the shaking operation (i.e., in which the take-back direction is toward the back side 1d and the release direction toward the front side 1b) will cause the detected acceleration values to develop a change pattern with its polarity in inverse relation to what is shown in FIGS. 6A through 7. Such differences need only be detected when the two kinds of shaking operation are to be distinguished.

With this embodiment of the invention, a variety of shaking operations may be suitably combined and assigned to each of different actions of the portable content player 1 for their activation. In the foregoing description, the acceleration sensor 21 with its sensing signal was shown utilized to sense acceleration in conjunction with the setup in which acceleration values are detected along the three axes (X, Y and Z) established on the main body 1A. Alternatively, acceleration may be sensed along as many axes as are needed depending on the types of shaking operation and their combinations. For example, if the shaking operation of FIG. 4 is adopted and if the orientation of the main body 1A relative to the horizontal plane is to be ignored, then acceleration along the Y axis alone may be detected. If the shaking operation of FIG. 4 is combined with that of FIG. 12, then acceleration may be detected illustratively along the Z axis alone in addition to the Y axis.

Whereas a variety of shaking operations can be assigned to each of diverse actions of the portable content player 1 for their activation, any one shaking operation need not be limited to any one action (i.e., controlled action) of the player according to the present invention. For example, in addition to shuffle reproduction mode switchover, the shaking operations may be assigned to any of such actions as content selection, reproduction volume control, switching of modes other than the shuffle reproduction mode, and player reset. Illustratively, a shaking operation may be arranged to trigger switchover from normal reproduction mode to shuffle reproduction mode. The shaking operations according to the present invention may be applied to diverse equipment other than portable content players, and the actions of such equipment to which to assign shaking operations are not limited to specific kinds.

It should be understood by those skilled in the art that various modifications, combinations, sub-combinations and alterations may occur depending on design requirements and other factor in so far as they are within the scope of the appended claims or the equivalents thereof.

What is claimed is:

1. An electronic apparatus comprising:
   a control device configured to determine whether a shaking operation is performed on a main body of said electronic apparatus in a predetermined axial direction based on whether a motion-added acceleration value in said predetermined axial direction is determined to exceed a predetermined value, wherein said motion-added acceleration value is an acceleration value obtained by adding up a predetermined number of acceleration values recently acquired in said predetermined axial direction at constant intervals; and
   wherein said control device is further configured to control said electronic apparatus to perform a predetermined action if said shaking operation is determined to occur by said control device.

2. The electronic apparatus according to claim 1, wherein said control device is connected to an acceleration sensing device configured to sense acceleration in said axial direction; and
   wherein said control device determines whether said shaking operation is performed on said main body based on a sensing output coming from said acceleration sensing device.

3. The electronic apparatus according to claim 1, wherein said control device controls said electronic apparatus to perform said predetermined action if said shaking operation is determined to have occurred a predetermined number of times within a predetermined time period by said control device.

4. The electronic apparatus according to claim 1, wherein said control device determines whether a shaking operation is performed based on acceleration sensed in each of at least two predetermined axial directions; and
   wherein said control device controls said electronic apparatus to perform a different predetermined action based on said shaking operation determined to occur by said control device.

5. The electronic apparatus according to claim 1, further comprising an inclination angle sensing device configured to sense an inclination angle in said predetermined axial direction;
   wherein said control device controls said electronic apparatus to perform said predetermined action based on whether said shaking operation is determined to be performed on said main body of said electronic apparatus in said predetermined axial direction by said control device and in accordance with the inclination angle sensed by said inclination angle sensing device when said shaking operation is determined to be performed on said main body of said electronic apparatus in said predetermined axial direction.

6. The electronic apparatus according to claim 1, further comprising:
   an operation device; and
   an operation determination device configured to determine whether an operation is performed on said operation device;
   wherein said control device controls said electronic apparatus to perform said predetermined action based on whether said operation is determined to be performed on said operation device by said operation determination device.

7. The electronic apparatus according to claim 1, further comprising a reproduction device configured to reproduce content data;
   wherein said predetermined action is an action for changing a reproduction mode in which to reproduce said content data.

8. The electronic apparatus according to claim 7, wherein said action for changing said reproduction mode involves changing a shuffle reproduction mode in which said content data is reproduced in a random sequence.

9. A controlling method comprising the steps of:
   determining whether a pattern of shaking operation is performed on a main body of an apparatus in a predetermined axial direction based on whether a motion-added acceleration value in said predetermined axial direction is determined to exceed a predetermined value, wherein said motion-added acceleration value is an acceleration value obtained by adding up a predetermined number of acceleration values recently acquired in said predetermined axial direction at constant intervals; and
   controlling said apparatus to perform a predetermined action if said shaking operation is determined to occur in the shaking operation determining step.

10. The controlling method according to claim 9, wherein said controlling step controls said apparatus to perform said predetermined action if said shaking operation is determined to have occurred a predetermined number of times within a predetermined time period.

11. The controlling method according to claim 9, wherein said shaking operation determining step determines whether said shaking operation is performed based on whether acceleration is sensed in each of at least two predetermined axial directions; and
    wherein said controlling step controls said apparatus to perform a different predetermined action based on said shaking operation determined to occur in said shaking operation determining step.

12. The controlling method according to claim 9, further comprising the step of sensing an inclination angle in said predetermined axial direction;
    wherein said controlling step controls said apparatus to perform said predetermined action based on whether said shaking operation is determined to be performed on said main body of said apparatus in said predetermined axial direction and in accordance with the inclination angle sensed in the inclination angle sensing step when said shaking operation is determined to be performed on said main body of said apparatus in said predetermined axial direction.

13. The controlling method according to claim 9, further comprising the step of determining whether an operation is performed on an operation device of said apparatus;
    wherein said controlling step controls said apparatus to perform said predetermined action based on whether said operation is determined to be performed on said operation device in said determining step.

14. The controlling method according to claim 9, further comprising the step of reproducing content data;
    wherein said predetermined action is an action for changing a reproduction mode in which to reproduce said content data.

15. The controlling method according to claim 14, wherein said action for changing said reproduction mode involves changing a shuffle reproduction mode in which said content data is reproduced in a random sequence.

16. A non-transitory recording medium which records a program in a manner readable by a computer, said program when executed causing said computer to execute a procedure comprising the steps of:

determining whether a shaking operation is performed on a main body of an apparatus in a predetermined axial direction based on whether a motion-added acceleration value in said predetermined axial direction is determined to exceed a predetermined value, wherein said motion-added acceleration value is an acceleration value obtained by adding up a predetermined number of acceleration values recently acquired in said predetermined axial direction at constant intervals; and controlling said apparatus to perform a predetermined action if said shaking operation is determined to occur in the shaking operation determining step.

17. An electronic apparatus comprising:

a control device configured to determine whether a reciprocal shaking operation is performed on a main body of said electronic apparatus in a predetermined axial direction based on whether a reciprocal motion is sensed within a predetermined time period in said predetermined axial direction, wherein said reciprocal shaking operation is sensed based on a change pattern in which a gradual increase in an absolute value of acceleration is observed in a negative direction during an initial take-back period followed by an abrupt surge of acceleration in a positive direction during a subsequent release period; and wherein said control device is further configured to control said electronic apparatus to perform a predetermined action if said reciprocal shaking motion is determined to occur by said control device.

18. A controlling method comprising the steps of:

determining whether a reciprocal shaking operation is performed on a main body of an apparatus in a predetermined axial direction based on whether a reciprocal motion is sensed within a predetermined time period in said predetermined axial direction, wherein said reciprocal shaking operation is sensed based on a change pattern in which a gradual increase in an absolute value of acceleration is observed in a negative direction during an initial take-back period followed by an abrupt surge of acceleration in a positive direction during a subsequent release period; and controlling said apparatus to perform a predetermined action if said reciprocal shaking motion is determined to occur in the reciprocal shaking operation determining step.

\* \* \* \* \*